US008966596B2

(12) United States Patent
Saito

(10) Patent No.: US 8,966,596 B2
(45) Date of Patent: Feb. 24, 2015

(54) COMMUNICATION APPARATUS

(75) Inventor: Ken Saito, Tokoname (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 166 days.

(21) Appl. No.: 13/615,296

(22) Filed: Sep. 13, 2012

(65) Prior Publication Data

US 2013/0139225 A1 May 30, 2013

(30) Foreign Application Priority Data

Nov. 30, 2011 (JP) ................................. 2011-261539

(51) Int. Cl.
*H04L 29/06* (2006.01)
(52) U.S. Cl.
USPC ........................................ 726/5; 726/3; 726/4
(58) Field of Classification Search
None
See application file for complete search history.

(56) References Cited

U.S. PATENT DOCUMENTS 7,577,662 B2 *  8/2009  Kasatani ............................. 1/1
8,055,902 B2 * 11/2011  Crichton et al. ............. 713/181
2010/0185750 A1 *  7/2010  Nakayama ..................... 709/219
2010/0239093 A1 *  9/2010  Hotta ............................. 380/270
2013/0055364 A1 *  2/2013  Tanji ................................. 726/5

FOREIGN PATENT DOCUMENTS

| JP | 2004-227197 A | 8/2004 |
| JP | 2005-269250 A | 9/2005 |
| JP | 2009-086936 A | 4/2009 |

* cited by examiner

*Primary Examiner* — Minh Dinh
(74) *Attorney, Agent, or Firm* — Merchant & Gould PC

(57) ABSTRACT

A communication apparatus is configured to communicate with a service providing server. The service providing server provides a data upload service and, for each user, associate and stores authentication information for a user and an e-mail address for the user. The communication apparatus includes: a storage control unit storing specific authentication information for a specific user in a memory; an acquisition unit which, when an upload instruction for uploading target data to the service providing server is input from the specific user, uses the specific authentication information in the memory to acquire a specific e-mail address, which is stored in association with the specific authentication information, from the service providing server; and an upload unit that transmits a specific e-mail including the target data and the specific e-mail address as a transmission destination address, for uploading the target data to the service providing server.

13 Claims, 2 Drawing Sheets

COMMUNICATION APPARATUS

CROSS-REFERENCE TO RELATED APPLICATIONS

This application claims priority from Japanese Patent Application No. 2011-261539 filed on Nov. 30, 2011, the entire subject matter of which is incorporated herein by reference.

TECHNICAL FIELD

The invention relates to a communication apparatus configured to communicate with a service providing server, which provides a data upload service, through an internet.

BACKGROUND

There have been proposed an image processing apparatus that scans a document to generate image data. The image processing apparatus may upload the image data to a server.

SUMMARY

Illustrative aspects of the invention provide a technology with which a user can easily upload target data to a service providing server.

According to one illustrative aspect of the invention, there is provided a communication apparatus configured to communicate with a service providing server through an internet. The service providing server is configured to provide a data upload service, and wherein the service providing server is configured to, for each user, associate and store authentication information for a user and an e-mail address for the user. The communication apparatus comprises: a storage control unit configured to store specific authentication information for a specific user in a memory of the communication apparatus; an acquisition unit configured to, when an upload instruction for uploading target data to the service providing server is input from the specific user, use the specific authentication information in the memory to acquire a specific e-mail address from the service providing server, wherein the specific e-mail address is stored in the service providing server with being associated with the specific authentication information; and an upload unit configured to transmit a specific e-mail, which includes the target data, and in which the specific e-mail address is designated as a transmission destination address, so as to upload the target data to the service providing server.

DETAILED DESCRIPTION

<General Overview>

Figure 1:
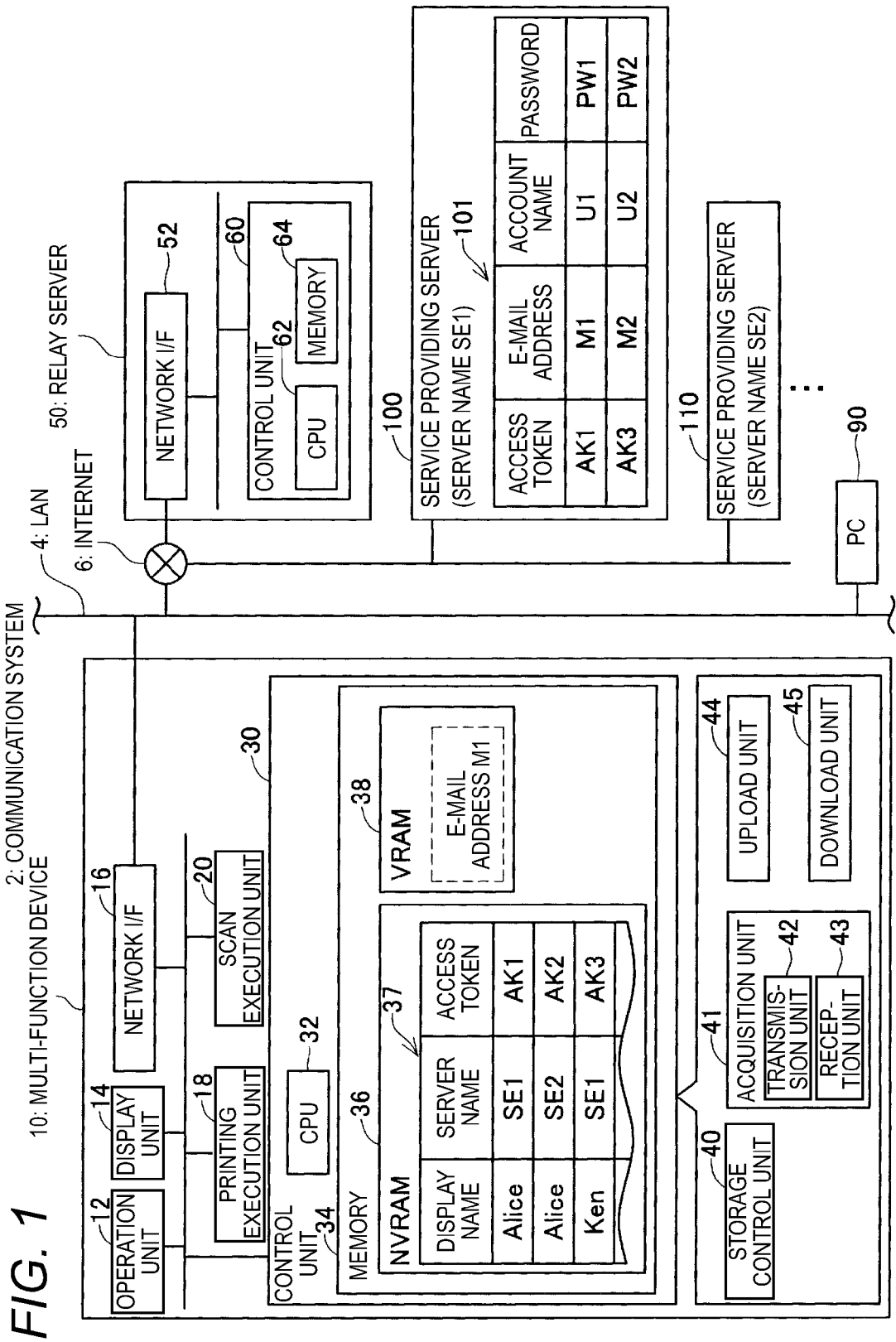
FIG. 1 shows a configuration of a communication system.

Illustrative aspects of the invention provide a technology with which a user can easily upload target data to a service providing server.

According to a first illustrative aspect of the invention, there is provided a communication apparatus configured to communicate with a service providing server through an internet. The service providing server is configured to provide a data upload service, and wherein the service providing server is configured to, for each user, associate and store authentication information for a user and an e-mail address for the user. The communication apparatus comprises: a storage control unit configured to store specific authentication information for a specific user in a memory of the communication apparatus; an acquisition unit configured to, when an upload instruction for uploading target data to the service providing server is input from the specific user, use the specific authentication information in the memory to acquire a specific e-mail address from the service providing server, wherein the specific e-mail address is stored in the service providing server with being associated with the specific authentication information; and an upload unit configured to transmit a specific e-mail, which includes the target data, and in which the specific e-mail address is designated as a transmission destination address, so as to upload the target data to the service providing server.

According thereto, when the upload instruction is input from the specific user, the communication apparatus uses the specific authentication information in the memory to acquire the specific e-mail address for the specific user from the service providing server. Then, the communication apparatus transmits the specific e-mail in which the specific e-mail address is designated as a transmission destination address, so as to upload the target data to the service providing server. Accordingly, the specific user does not need to execute an operation of operating an operation unit of the communication apparatus to input the specific e-mail address to the communication apparatus. Hence, the specific user can easily upload the target data to the service providing server.

According to a second illustrative aspect of the invention, the acquisition unit comprises: a transmission unit configured to, when the upload instruction is input, transmit the specific authentication information to a relay server, wherein the relay server is configured to relay provision of the data upload service from the service providing server to the communication apparatus; and a reception unit configured to receive the specific e-mail address, which the relay server has acquired from the service providing server by using the specific authentication information, from the relay server.

According thereto, the communication device can appropriately acquire the specific e-mail address.

According to a third illustrative aspect of the invention, the service providing server is further configured to provide a data download service. The acquisition unit does not acquire the specific e-mail address from the service providing server when a download instruction for downloading the target data uploaded from the service providing server is input from the specific user. The communication apparatus further comprises a download unit configured to, when the download instruction is input, download the target data from the service providing server by using the specific authentication information in the memory.

According thereto, when the download instruction is input, the communication apparatus downloads the target data from the service providing server by using the specific authentication information in a memory, without acquiring the specific e-mail address from the service providing server. Thus, even when the upload instruction is input from the specific user and even when the download instruction is input from the specific user, the communication apparatus can use the common authentication information. Therefore, compared to a configuration in which both the authentication information for upload and the authentication information for download are stored in the memory, it is possible to reduce an amount of information to be stored in the memory.

According to a fourth illustrative aspect of the invention, the service providing server supports a first type upload request based on a first communication protocol for e-mail communication. The service providing server does not support a second type upload request based on a second communication protocol that is different from the first communication protocol. The service providing server supports a second type download request based on the second communication protocol. The upload unit is configured to transmit the specific e-mail, which is the first type upload request, so as to upload the target data to the service providing server when the upload instruction is input. The download unit is configured to transmit the second type download request to the service providing server so as to download the target data from the service providing server when the download instruction is input.

According thereto, the communication apparatus can appropriately execute the upload and download of the target data in accordance with an upload request and a download request supported by the service providing server.

According to a fifth illustrative aspect of the invention, the memory comprises a non-volatile memory and a volatile memory. The storage control unit is configured to: store the specific authentication information in the non-volatile memory; and store the specific e-mail address in the volatile memory, not in the non-volatile memory, when the specific e-mail address is acquired.

According thereto, since the specific e-mail address is not stored in the non-volatile memory, it is possible to reduce an amount of information to be stored in the non-volatile memory.

According to a sixth illustrative aspect of the invention, each authentication information for each user, which is stored in the service providing server, comprise an access token. The specific authentication information comprises a specific access token for the specific user.

Incidentally, a control method, a computer program and a computer-readable storage device storing the computer program for implementing the communication apparatus are also novel and useful.

<Exemplary Embodiments>

Exemplary embodiments of the invention will now be described with reference to the drawings.

(Configuration of System)

As shown in FIG. 1, a communication system 2 includes a multi-function device 10, a relay server 50, a PC 90 and a plurality of service providing servers 100, 110. The multi-function device 10 and the PC 90 are connected to a LAN 4. The relay server 50 and the service providing servers 100, 110 are connected to an internet 6. The multi-function device 10 can communicate with the relay server 50 and the respective service providing servers 100, 110 through the internet 6.

(Configuration of Multi-Function Device 10)

The multi-function device 10 can execute various functions such as a printing function, scan function, copy function and FAX function. The multi-function device 10 can further execute a download printing function (hereinafter, referred to as a 'DL printing function') of downloading image data stored in the service providing servers 100, 110 and printing an image indicated by the image data. Also, the multi-function device 10 can further execute a scan upload function (hereinafter, referred to as a 'scan UL function') of uploading image data, which is generated by performing the scan function, to the service providing servers 100, 110.

The multi-function device 10 includes an operation unit 12, a display unit 14, a network interface 16, a printing execution unit 18, a scan execution unit 20 and a control unit 30. The operation unit 12 includes a plurality of keys. A user can operate the operation unit 12 to input a variety of instructions to the multi-function device 10. The display unit 14 can display a variety of information. The network interface 16 is connected to the LAN 4. The printing execution unit 18 is configured by a printing mechanism of an inkjet type, a laser type or the like. The scan execution unit 20 is configured by a scan mechanism of a CCD, CIS or the like.

The control unit 30 includes a CPU 32 and a memory 34. The CPU 32 executes a variety of processing in response to programs (not shown) stored in the memory 34. As the CPU 32 executes the processing in response to the programs, each function of a storage control unit 40, an acquisition unit 41, an upload unit 44 and a download unit 45 may be implemented. The acquisition unit 41 includes a transmission unit 42 and a reception unit 43.

The memory 34 includes an NVRAM 36 and a VRAM 38. The NVRAM 36 is a non-volatile memory. Accordingly, even when a power supply of the multi-function device 10 is off, the data in the NVRAM 36 is not erased. The NVRAM 36 stores therein a display name table 37. The display name table 37 stores information in which a display name, a server name and an access token are associated each other. A method of generating the display name table 37 will be specifically described later. The VRAM 38 is a volatile memory. Therefore, when the power supply of the multi-function device 10 is off, the data in the VRAM 38 is erased.

(Configuration of Relay Server 50)

The relay server 50 is configured to relay provision of services from the service providing servers 100, 110 to the multi-function device 10. The relay server 50 is provided by a vendor of the multi-function device 10. The relay server 50 includes a network interface 52 and a control unit 60. The control unit 60 includes a CPU 62 and a memory 64. The CPU 62 executes a variety of processing in response to programs stored in the memory 64.

(Configuration of Service Providing Servers 100, 110)

The respective service providing servers 100, 110 are the known service providing servers such as 'Evernote (registered trademark)', 'Google (registered trademark) Docs', 'Picasa (registered trademark)', 'Facebook (registered trademark)' and the like, for example. In this exemplary embodiment, it is assumed that a server name of the service providing server 100 is 'SE1 (for example, 'Evernote (registered trademark)') and a server name of the service providing server 110 is 'SE2 (for example, 'Google (registered trademark) Docs').

The respective service providing servers 100, 110 can provide a service to a variety of communication devices including the multi-function device 10. For example, the respective service providing servers 100, 110 can execute a data upload service (hereinafter, referred to as a 'UL service') of storing image data that is acquired from the multi-function device 10 when the multi-function device 10 executes the scan UL function. Also, the respective service providing servers 100, 110 can execute a data download service (hereinafter, referred to as a 'DL service') of providing image data to the multi-function device 10 when the multi-function device 10 executes a DL printing function.

Incidentally, the service providing server 100 is provided by a first service provider (e.g., first company), and the service providing server 110 is provided by a second service provider (e.g., second company) that is different from the first service provider. The first service provider discloses a first API (which is an abbreviation for Application Program Interface) for getting a service from the service providing server 100 and the second service provider discloses a second API for getting a service from the service providing server 110.

Since the first service provider and the second service provider are different, the first API and the second API are different. The communication device needs to support both the first and second APIs so as to get a service from both the service providing servers 100, 110 (that is, both a program for using the first API and a program for using the second API are necessary).

For example, in order for the multi-function device 10 to get services from the respective service providing servers 100, 110, the multi-function device 10 needs to support a plurality of APIs, so that the multi-function device 10 needs to store many programs. However, a storage capacity of the multi-function device 10 is smaller, compared to a PC and the like. Therefore, in this exemplary embodiment, the relay server 50 is provided, so that the multi-function device 10 can get services from the respective service providing servers 100, 110 without storing many programs in the multi-function device 10. That is, the relay server 50 supports a plurality of APIs for the service providing servers 100, 110. In a situation where the multi-function device 10 is to get a service from a specific service providing server (for example, service providing server 100) of the plurality of service providing servers 100, 110, the relay server 50 uses an API for the specific service providing server to perform various communications (for example, a request R4, responses R6, R14 and the like in FIG. 2, which will be described later) for the specific service providing server. Thereby, the multi-function device 10 can perform communication of the image data with the specific service providing server without supporting the API for the specific service providing server. That is, the multi-function device 10 can get the services from the respective service providing servers 100, 110, even though the multi-function device 10 does not store many programs for using a plurality of APIs therein.

The service providing server 100 stores therein a user information table 101. The user information table 101 stores information, in which an access token, an e-mail address, an account name and a password are associated. A method of generating the user information table 101 will be specifically described later. Incidentally, the service providing server 110 also stores therein a user information table (not shown) as similar to the service providing server 100.

As for a method of an upload request to the known service providing server on the internet 6, there have been known a method of using a command based on an HTTP (which is an abbreviation for Hyper Text Transfer Protocol) and a method of using an e-mail based on an SMTP (Simple Mail Transfer Protocol). However, not all service providing servers support both methods. For example, in this exemplary embodiment, the service providing server 100 (for example, 'Evernote (registered trademark)') supports an upload request based on the SMTP but does not support an upload request based on the HTTP. That is, when receiving an upload request based on the SMTP, the service providing server 100 provides a UL service in response to the upload request (that is, the service providing server 100 supports the upload request based on the SMTP). However, when receiving an upload request based on the HTTP, the service providing server 100 does not provide the UL service in response to the upload request (that is, the service providing server 100 does not support the upload request based on the HTTP).

Also, as a method of a download request to the known service providing server on the internet 6, there have been known a method of using a command based on the HTTP. In this exemplary embodiment, the service providing server 100 supports a download request based on the HTTP. That is, when receiving a download request based on the HTTP, the service providing server 100 provides a DL service in response to the download request (that is, the service providing server 100 supports the download request based on the HTTP).

(Respective Processing Executed by Respective Devices 10, 50, 100)

Subsequently, respective processing that is executed by the respective devices 10, 50, 100 will be described with reference to FIG. 2.

(Registration Processing)

In order to get the services from the respective service providing servers 100, 110, a user (hereinafter, referred to as a 'specific user') of the multi-function device 10 needs to execute following preparation processing so as for the multi-function device 10. The specific user uses the PC 90 to register an account name 'U1' and a password 'PW1' for getting a service from the service providing server 100 with the service providing server 100. In this case, the service providing server 100 issues an e-mail address 'M1' for the specific user, associates the account name 'U1', the password 'PW1' and the e-mail address 'M1,' and registers the associated information in the user information table 101.

Then, the specific user uses the PC 90 to access the relay server 50, thereby selecting 'acquisition of authentication information.' Incidentally, in this exemplary embodiment, the 'authentication information' means an access token (for example, 'AK1'), which will be described later. When the 'acquisition of authentication information' is selected, the relay server 50 transmits a specific URL for accessing the service providing server 100 to the PC 90. The specific URL includes a generation instruction for instructing the service providing server 100 to generate an access token and a transmission instruction for instructing the service providing server 100 to transmit the access token to the relay server 50. Then, the specific user uses the specific URL to access the service providing server 100 from the PC 90. Then, the specific user inputs the account name 'U1' and the password 'PW1' to the service providing server 100 through the PC 90, for executing an authentication procedure with the service providing server 100. When the authentication is successful, the service providing server 100 generates an access token 'AK1' for the specific user and transmits the access token 'AK1' to the relay server 50. In the meantime, at this time, the service providing server 100 registers the access token 'AK1' in the user information table 101 in association with the account name 'U1', the password 'PW1' and the e-mail address 'M1.' When the access token 'AK1' is received from the service providing server 100, the relay server 50 generates a temporary ID and transmits the temporary ID to the PC 90. Thereby, the temporary ID is displayed on the PC 90. The specific user can know the temporary ID displayed on the PC 90.

Then, the specific user operates the operation unit 12 of the multi-function device 10 to input the server name 'SE1' of the service providing server 100 and a display name 'Alice', which is a display name of the specific user on the multi-function device 10, to the multi-function device 10. Further, the specific user operates the operation unit 12 of the multi-function device 10 to input the temporary ID to the multi-function device 10. In this case, the multi-function device 10 transmits the temporary ID to the relay server 50. Thereby, the relay server 50 transmits the access token 'AK1' to the multi-function device 10. According thereto, the registration instruction of FIG. 2 is provided to the multi-function device 10. As a result, the storage control unit 40 (refer to FIG. 1) of the multi-function device 10 associates and stores the display name "Alice', which is input by the specific user, the server name 'SE1', which is input by the specific user, and the access token 'AK1', which is acquired from the relay server 50, in the display name table 37.

As described above, the service providing server 100 and the relay server 50 do not transmit the access token 'AK1' to the PC 90, and the relay server 50 temporarily holds the access token 'AK1.' Then, the multi-function device 10 uses the temporary ID to acquire the access token 'AK1' from the relay server 50. Thereby, it is possible to suppress the access token 'AK1' from being displayed on the PC 90 or transmitted from the PC to the other device. As a result, it is possible to prevent the high-security information such as access token from being leaked. Incidentally, the e-mail address 'M1' for the specific user is not stored in the display name table 37. That is, the storage control unit 40 does not store the e-mail address 'M1' in the NVRAM 36. Incidentally, the specific user can associate and register the display name 'Alice', the server name 'SE2' and the access token 'AK2' in the display name table 37 regarding the service providing server 110, as similar to the above processing.

(Processing Enabling Multi-Function Device 10 to Get a UL Service)

In the below, each processing that is executed by the respective devices 10, 50, 100 so as for the multi-function device 10 to get the UL service will be described. Although not shown, the specific user operates the operation unit 12 of the multi-function device 10 to select a service providing server, from which the UL service is given, and to select a display name for the specific user. In this exemplary embodiment, a case is exemplified in which the service providing server 100 (e.g., the server name 'SE1') is selected by the specific user and the display name 'Alice' is selected by the specific user. The specific user also operates the operation unit 12 to select the scan UL function from a plurality of functions that can be executed by the multi-function device 10. Thereby, an upload instruction is provided to the multi-function device 10 from the specific user.

As described above, the service providing server 100 does not support the upload request based on the HTTP but supports the upload request based on the SMTP. Therefore, an e-mail address, which is to be designated as a transmission destination address of an e-mail (e-mail EM that will be described later) of the upload request, is necessary. Hence, the acquisition unit 41 (refer to FIG. 1) of the multi-function device 10 executes following respective processing so as to acquire an e-mail address from the service providing server 100. That is, when the upload instruction is input by the specific user, the acquisition unit 41 first specifies the access token 'AK1', which is associated with the server name 'SE1' and the display name 'Alice', from the display name table 37 in the NVRAM 36. Then, the transmission unit 42 (refer to FIG. 1) transmits a request R2 including the specified access token 'AK1' to the relay server 50. Incidentally, the request R2 is a request for instructing the relay server 50 to transmit the e-mail address 'M1' (refer to the user information table 101 in the service providing server 100) associated with the access token 'AK1' to the multi-function device 10.

When the request R2 is received from the multi-function device 10, the control unit 60 of the relay server 50 generates a request R4 including the access token 'AK1' in accordance with the first API and transmits the request R4 to the service providing server 100. The request R4 is a request for instructing the service providing server 100 to transmit the e-mail address 'M1' associated with the access token 'AK1' to the relay server 50.

When the service providing server 100 receives the request R4, the service providing server 100 executes authentication processing of the access token 'AK1' (that is, the service providing server 100 determines whether the access token 'AK1' is registered in the user information table 101). When the authentication is successful (e.g., when the access token 'AK1' is registered in the user information table 101), the service providing server 100 specifies the e-mail address 'M1' associated with the access token 'AK1' from the user information table 101. Then, the service providing server 100 transmits a response R6 including the specified e-mail address 'M1' to the relay server 50.

When the response R6 is received from the service providing server 100, the control unit 60 of the relay server 50 generates a response R8 including the e-mail address 'M1' and transmits the response R8 to the multi-function device 10.

The reception unit 43 (refer to FIG. 1) of the multi-function device 10 receives the response R8 from the relay server 50. Thereby, the acquisition unit 41 acquires the e-mail address 'M1' from the service providing server 100 via the relay server 50. As described above, in this exemplary embodiment, the multi-function device 10 uses the relay server 50 to acquire the e-mail address 'M1' from the service providing server 100. Therefore, the multi-function device 10 can acquire the e-mail address 'M1' from the service providing server 100, even though the multi-function device 10 does not support the first API. When the e-mail address 'M1' is acquired from the service providing server 100, the storage control unit 40 stores the e-mail address 'M1' in the VRAM 38. Thereby, the upload unit 44 (refer to FIG. 1) can use the e-mail address 'M1' in the VRAM 38 when transmitting the e-mail EM in subsequent processing. On the other hand, the storage control unit 40 does not store the e-mail address 'M1' in the NVRAM 36. Thereby, it is possible to reduce an amount of information to be stored in the NVRAM 36.

Then, the control unit 30 enables the scan execution unit 20 to scan a document. In the below, image data generated by scanning the document is referred to as 'specific image data.' Then, the upload unit 44 generates an e-mail EM, in which the e-mail address 'M1' in the VRAM 38 is designated as a transmission destination address, in accordance with the SMTP (which is an abbreviation for Simple Mail Transfer Protocol). The e-mail EM includes the specific image data. The upload unit 44 transmits the e-mail EM to the service providing server 100 in accordance with the SMTP. The e-mail EM is a request for instructing the service providing server 100 to store (e.g., upload) the specific image data. That is, the e-mail EM is an upload request based on the SMTP.

When the service providing server 100 receives the e-mail EM, the service providing server 100 stores (uploads) the specific image data included in the e-mail EM with being associated with the user information (for example, the account name 'U1') for the specific user. Thereby, the UL service is provided from the service providing server 100 to the multi-function device 10. That is, the multi-function device 10 can execute the scan UL function.

Incidentally, there is a possibility that the service providing server 100 supports an upload request based on the SMTP and an upload request (hereinafter, referred to as 'specific upload request'), based on a protocol different from the HTTP. Also, there is a possibility that although the multi-function device 10 does not have a program for transmitting the specific upload request, the relay server 50 has the program. In this case, when the specific image data is transmitted from the multi-function device 10 to the relay server 50 and the specific upload request including the specific image data is transmitted from the relay server 50 to the service providing server 100, the specific image data may be uploaded to the service providing server 100.

However, when the above method is used, the specific image data indicative of a private image of the specific user is transmitted via the relay server 50 that is provided by the vendor of the multi-function device 10. Thus, it is not preferable to use the above method, from a standpoint of protecting private information of the specific user. Therefore, in this exemplary embodiment, even when the relay server 50 has a program for transmitting the specific upload request, the upload unit 44 of the multi-function device 10 transmits the e-mail EM including the specific image data, so as to upload the specific image data to the service providing server 100. Thereby, since the specific image data is not transmitted from the multi-function device 10 to the service providing server 100 via the relay server 50, it is possible to prevent the private image of the specific user from being transmitted via the relay server 50.

Figure 2:
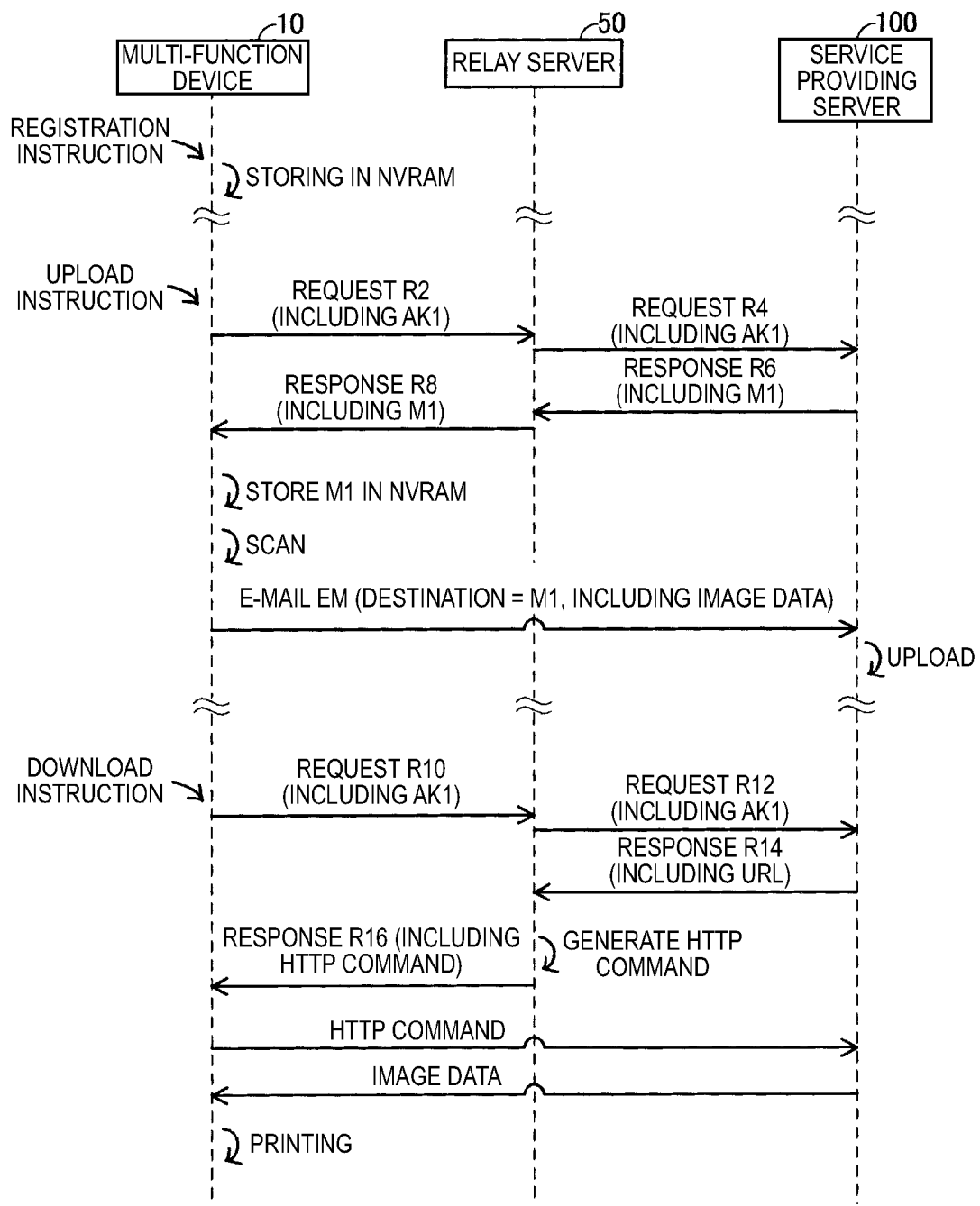
FIG. 2 is a sequence diagram of each processing that is executed by each device.

Incidentally, although omitted in FIG. 2, when a new upload instruction for uploading the image data to the service providing server 100 is input from the specific user, the upload using the e-mail is executed as similar to the above processing. That is, every time when the specific user inputs an upload instruction, the acquisition unit 41 acquires the e-mail address 'M1' from the service providing server 100, and the upload unit 44 transmits an e-mail in which the e-mail address 'M1' is designated as a transmission destination, so as to upload the image data to the service providing sever 100.

(Processing Enabling Multi-Function Device 10 to Get a DL Service)

Subsequently, respective processing that is executed by the respective devices 10, 50, 100 so as for the multi-function device 10 to get the DL service will be described. Although not shown, as similar to the UL service, the specific user operates the operation unit 12 of the multi-function device 10 to select the service providing server 100 (e.g., the server name 'SE1') and the display name 'Alice.' The specific user also operates the operation unit 12 to select the DL printing function from a plurality of functions that can be executed by the multi-function device 10. Thereby, a download instruction is provided to the multi-function device 10 from the specific user.

In the meantime, when inputting the download instruction to the multi-function device 10, the specific user selects image data of a download target from one or more image data that has been previously uploaded to the service providing server 100 by the specific user. For example, the specific user designates a file name of image data or selects a thumbnail of image data for selecting image data of a download target. In this exemplary embodiment, a case is described in which the specific user selects the specific image data (e.g., image data generated by scanning a document).

As described above, the service providing server 100 supports a download request based on the HTTP. When a download instruction is input, the multi-function device 10 does not require acquiring the e-mail address from the service providing server 100. Therefore, differently from the above-described UL service, the acquisition unit 41 does not acquire the e-mail address from the service providing server 100 even when the specific user inputs a download instruction. Hence, it is possible to reduce the processing load of the multi-function device 10.

When the specific user inputs a download instruction, the download unit 45 (refer to FIG. 1) specifies the access token 'AK1', which is associated with the server name 'SE1' and the display name 'Alice', from the display name table 37 in the NVRAM 36. Then, the download unit 45 transmits a request R10 including the specified access token 'AK1' to the relay server 50. The request R10 is a request for instructing the relay server 50 to transmit a URL (hereinafter, referred to as a 'URL of a download source') of the specific image data of the download target to the multi-function device 10.

When the request R10 is received from the multi-function device 10, the control unit 60 of the relay server 50 generates a request R12 including the access token 'AK1' in accordance with the first API and transmits the request R12 to the service providing server 100. The request R12 is a request for instructing the service providing server 100 to transmit the URL of the download source to the relay server 50.

When the service providing server 100 receives the request R12, the service providing server 100 executes the authentication processing of the access token 'AK1.' When the authentication is successful, the service providing server 100 transmits a response R14, which includes the URL (e.g., URL of the download source) of the specific image data associated with the user information (for example, account name 'U1') for the specific user, to the relay server 50.

When the response R14 is received from the service providing server 100, the control unit 60 of the relay server 50 generates an HTTP command in accordance with the first API. Here, the HTTP command describes therein the URL of the download source. The HTTP command is a request for instructing the service providing server 100 to transmit the specific image data stored in the URL of the download source. That is, the HTTP command is a download request based on the HTTP. Then, the control unit 60 transmits the response R16 including the generated HTTP command to the multi-function device 10.

When the response R16 is received from the relay server 50, the download unit 45 of the multi-function device 10 transmits the HTTP command included in the response R16 to the service providing server 100 without via the relay server 50. As described above, in this exemplary embodiment, the relay server 50 generates the HTTP command in accordance with the first API and supplies the HTTP command to the multi-function device 10. Therefore, the multi-function device 10 can transmit the download request to the service providing server 100 by using the HTTP command acquired from the relay server 50, even though the multi-function device does not support the first API.

When the service providing server 100 receives the HTTP command from the multi-function device 10, the service providing server 100 supplies the specific image data, which is stored in the URL of the download source included in the HTTP command, to the multi-function device 10 without via the relay server 50. Since the specific image data is not transmitted from the service providing server 100 to the multi-function device 10 via the relay server 50, it is possible to prevent a private image of the specific user from being transmitted via the relay server 50.

The download unit 45 of the multi-function device 10 receives the specific image data from the service providing server 100. Thereby, the DL service is provided from the service providing server 100 to the multi-function device 10. Then, the control unit 30 enables the printing execution unit 18 to print an image that is represented by the specific image data. Thereby, the multi-function device 10 can execute the DL printing function.

Incidentally, although omitted in FIG. 2, when a new download instruction for downloading the image data from the service providing server 100 is input from the specific user, the download using the HTTP command is executed as similar to the above processing. That is, every time when the specific user inputs a download instruction, the download unit 45 acquires the download URL from the service providing server 100 and transmits the HTTP command, so as to download the image data from the service providing sever 100.

(Advantages of Exemplary Embodiment)

According to the exemplary embodiment, when the specific user inputs the upload instruction, the multi-function device 10 uses the access token 'AK1' in the NVRAM 36 to acquire the e-mail address 'M1' for the specific user from the service providing server 100. Then, the multi-function device 10 transmits the e-mail EM, in which the e-mail address 'M1' is designated as the transmission destination address, so as to upload the specific image data to the service providing server 100. Therefore, the specific user does not need to execute the operation of operating the operation unit 12 of the multi-function device 10 for inputting the e-mail address 'M1' to the multi-function device 10. Accordingly, the specific user can easily upload the specific image data to the service providing server 100.

The e-mail address 'M1' registered with the service providing server 100 may be changed by the specific user from a standpoint of the security enhancement. Even in this case, according to the exemplary embodiment, when the specific user inputs the upload instruction, the multi-function device 10 can acquire the changed e-mail address from the service providing server 100 and upload the image data to the service providing server 100. Thus, the multi-function device 10 according to the exemplary embodiment can easily upload the image data to the service providing server 100 as compared to a configuration in which every time when the e-mail address registered with the service providing server 100 is changed, the specific user inputs the changed e-mail address to the multi-function device.

Further, according to the exemplary embodiment, even when the upload instruction is input from the specific user and even when the download instruction is input from the specific user, the multi-function device 10 can get the UL service and the DL service from the service providing server 100 by using the common access token 'AK1.' Therefore, compared to a configuration in which a first access token for getting the UL service and a second access token for getting the DL service are stored in the memory, it is possible to reduce the amount of information to be stored in the memory 34 of the multi-function device 10. In addition, the specific user does not need to execute a procedure for registering the first access token with the multi-function device 10 and a procedure for registering the second access token with the multi-function device 10, and the specific user has only to execute a procedure for registering the common access token 'AK1' with the multi-function device 10. Therefore, it is possible to simplify a procedure (for example, registering procedure of the access token 'AK1') with which the specific user gets the UL service and the DL service from the service providing server 100.

The multi-function device 10 is one example of the 'communication apparatus.' The access token 'AK1', the e-mail address 'M1', the e-mail EM and the specific image data are examples of the 'specific authentication information', the 'specific e-mail address', the 'specific e-mail' and the 'target data', respectively. The SMTP and the HTTP are examples of the 'first communication protocol' and the 'second communication protocol', respectively. The e-mail EM and the HTTP command are examples of the 'first type upload request' and the 'second type download request', respectively. The transmission of the request R2 including the access token 'AK1' is one example of the processing 'using the specific authentication information in the memory', which is executed by the 'acquisition unit.' The transmission of the request R10 including the access token 'AK1' is one example of the processing 'using the specific authentication information in the memory', which is executed by the 'download unit.'

(Modifications to Exemplary Embodiments)

Although the exemplary embodiment of the invention has been specifically described, it is just exemplary and does not limit the scope of the invention. The technology defined in the claims includes a variety of changes and modifications to the exemplary embodiment. For example, following modified exemplary embodiments are included.

(1) The 'communication apparatus' is not limited to the multi-function device 10 capable of executing the printing and scan functions and the like. For example, the 'communication apparatus' may be a printer capable of executing only the printing function and a scanner capable of executing only the scan function. Alternatively, the 'communication apparatus' may be a device of another type such as a PC, a mobile phone, a PDA, a FAX apparatus, a server and the like. Generally, the 'communication apparatus' is preferably a device that can be connected to the internet.

(2) The service providing server 100 may not provide both the UL service and the DL service. For example, the service providing server 100 may provide only the UL service or the other service (service, other than the DL service) different from the UL service. Generally, the 'service providing server' is preferably a server that provides the UL service.

(3) In the above-described exemplary embodiment, the access token is used as the 'authentication information.' Alternatively, the 'authentication information' may be combination information of a user name and a password. Generally, the 'authentication information' is preferably information that is used by the service providing server for authentication.

(4) In the above-described exemplary embodiment, the acquisition unit 41 acquires the e-mail address 'M1' from the service providing server 100 via the relay server 50. Alternatively, when the multi-function device 10 supports the first API (e.g., when the multi-function device 10 has a program for using the first API), for example, the acquisition unit 41 may transmit a request including the access token 'AK1' to the service providing server 100 without via the relay server 50 and acquire the e-mail address 'M1' from the service providing server 100 without via the relay server 50. Generally, the 'acquisition unit' may acquire the specific e-mail address from the service providing server by using the specific authentication information.

(5) In the above-described exemplary embodiment, the data, which is uploaded to the service providing server 100, is the image data generated by scanning the document. Alternatively, the data that is uploaded to the service providing server 100 may be data stored in an external memory (for example, USB memory) coupled to the multi-function device 10 or data acquired from an external apparatus (for example, PC 90) by the multi-function device 10. Generally, the 'target data' may be any data insomuch as it is data to be uploaded.

(6) In the above-described exemplary embodiment, the multi-function device 10 executes the printing, based on the data that is downloaded from the service providing server 100. Alternatively, the multi-function device 10 may store the data, which is downloaded from the service providing server 100, in an external memory (for example, USB memory) coupled to the multi-function device 10. Also, the multi-function device 10 may process (for example, image processing, calculation and the like) the data that is downloaded from the service providing server 100. Generally, when the 'target data' is downloaded, the communication apparatus may execute the printing as similar to the above-described exemplary embodiment, or execute the other processing.

(7) In the above-described exemplary embodiment, since the multi-function device 10 does not support the plurality of APIs, the relay server 50 is used. However, the multi-function device 10 may support the plurality of APIs. In this case, the multi-function device 10 may execute each communication for upload and download without via the relay server 50. Generally, the 'communication apparatus' may get the data upload service from the service providing server via the relay server or may get the data upload service from the service providing server without via the relay server.

(8) The 'second communication protocol' may be a communication protocol (for example, a known communication protocol that is used for internet communication, a special protocol that is used by the service providing server, and the like) different from the HTTP. Generally, the 'second communication protocol' is preferably a communication protocol different from the 'first communication protocol.'

(9) In the above-described exemplary embodiment, the CPU 32 of the multi-function device 10 executes the processing in response to the software, so that the functions of the respective units 40 to 45 are implemented. However, at least a part of the functions of the respective units 40 to 45 may be implemented by hardware such as logic circuit.

What is claimed is:

1. A communication apparatus configured to communicate with a service providing server through an internet, wherein the service providing server is configured to provide a data upload service, and wherein the service providing server is configured to, for each user, associate and store authentication information for a user and an e-mail address for the user, the communication apparatus comprising:
    a processor; and
    a memory storing instructions, the instructions, when executed by the processor, cause the communication apparatus to perform:
    storing specific authentication information for a specific user in the memory;
    when an upload instruction for uploading target data to the service providing server is input from the specific user, using the specific authentication information in the memory to acquire a specific e-mail address from the service providing server, wherein the specific e-mail address is stored in the service providing server in association with the specific authentication information; and
    transmitting a specific e-mail, which includes the target data, and in which the specific e-mail address is designated as a transmission destination address, so as to upload the target data to the service providing server.

2. The communication apparatus according to claim 1, wherein the instructions, when executed by the processor, further cause the communication apparatus to perform :
    when the upload instruction is input, transmitting the specific authentication information to a relay server, wherein the relay server is configured to relay provision of the data upload service from the service providing server to the communication apparatus; and
    receiving the specific e-mail address, which the relay server has acquired from the service providing server by using the specific authentication information, from the relay server.

3. The communication apparatus according to claim 1,
    wherein the service providing server is further configured to provide a data download service,
    wherein using the specific authentication information in the memory to acquire the specific e-mail address does not acquire the specific e-mail address from the service providing server when a download instruction for downloading the target data uploaded from the service providing server is input from the specific user, and
    wherein the instructions, when executed by the processor, further cause the communication apparatus to, when the download instruction is input, download the target data from the service providing server by using the specific authentication information in the memory.

4. The communication apparatus according to claim 3,
    wherein the service providing server supports a first type upload request based on a first communication protocol for e-mail communication,
    wherein the service providing server does not support a second type upload request based on a second communication protocol that is different from the first communication protocol,
    wherein the service providing server supports a second type download request based on the second communication protocol,
    wherein the communication apparatus is configured to transmit the specific e-mail, which is the first type upload request, so as to upload the target data to the service providing server when the upload instruction is input, and
    wherein the communication apparatus is configured to transmit the second type download request to the service providing server so as to download the target data from the service providing server when the download instruction is input.

5. The communication apparatus according to claim 1,
    wherein the memory comprises a non-volatile memory and a volatile memory, and
    wherein the instructions, when executed by the processor, further cause the communication apparatus to perform:
    storing the specific authentication information in the non-volatile memory; and
    storing the specific e-mail address in the volatile memory, not in the non-volatile memory, when the specific e-mail address is acquired.

6. The communication apparatus according to claim 1,
    wherein each authentication information for each user, which is stored in the service providing server, comprise an access token, and
    wherein the specific authentication information comprises a specific access token for the specific user.

7. A communication apparatus configured to communicate with a service providing server through an internet, wherein the service providing server is configured to provide a data upload service, and wherein the service providing server is configured to, for each user, associate and store authentication information for a user and an e-mail address for the user, the communication apparatus comprising:
    an operation unit configured to receive an instruction; and
    a control device configured to:
    store specific authentication information for a specific user in a memory of the communication apparatus;
    when the operation unit receives an upload instruction for uploading target data to the service providing server from the specific user, use the specific authentication information in the memory and acquire a specific e-mail address from the service providing server, wherein the specific e-mail address is stored in the service providing server in association with the specific authentication information; and
    transmit a specific e-mail, which includes the target data, and in which the specific e-mail address is designated as a transmission destination address, so as to upload the target data to the service providing server.

8. The communication apparatus according to claim 7, wherein when acquiring the specific e-mail from the service providing server, the control device is configured to:
- when the operation unit receives the upload instruction, transmit the specific authentication information to a relay server, wherein the relay server is configured to relay provision of the data upload service from the service providing server to the communication apparatus; and
- receive the specific e-mail address, which the relay server has acquired from the service providing server by using the specific authentication information, from the relay server.

9. The communication apparatus according to claim 7, wherein the service providing server is further configured to provide a data download service,
wherein when acquiring the specific e-mail from the service providing server, the control device is configured not to acquire the specific e-mail address from the service providing server when the operation unit receives a download instruction for downloading the target data uploaded from the service providing server from the specific user, and
wherein the control device is further configured to, when the operation unit receives the download instruction, download the target data from the service providing server by using the specific authentication information in the memory.

10. The communication apparatus according to claim 9,
wherein the service providing server supports a first type upload request based on a first communication protocol for e-mail communication,
wherein the service providing server does not support a second type upload request based on a second communication protocol that is different from the first communication protocol,
wherein the service providing server supports a second type download request based on the second communication protocol,
wherein the control device is configured to transmit the specific e-mail, which is the first type upload request, so as to upload the target data to the service providing server when the upload instruction is input, and
wherein the control device is configured to transmit the second type download request to the service providing server so as to download the target data from the service providing server when the operation unit receives the download instruction.

11. The communication apparatus according to claim 7,
wherein the memory comprises a non-volatile memory and a volatile memory, and
wherein the control device is configured to:
- store the specific authentication information in the non-volatile memory; and
- store the specific e-mail address in the volatile memory, not in the non-volatile memory, when the specific e-mail address is acquired.

12. The communication apparatus according to claim 7,
wherein each authentication information for each user, which is stored in the service providing server, comprise an access token, and
wherein the specific authentication information comprises a specific access token for the specific user.

13. A computer-readable storage device having a computer program stored thereon and readable by a computer installed in a communication apparatus, wherein the communication apparatus is configured to communicate with a service providing server through an internet, wherein the service providing server is configured to provide a data upload service, and wherein the service providing server is configured to, for each user, associate and store authentication information for a user and an e-mail address for the user, the computer program, when executed by the computer, causes the computer to perform operations comprising:
- storage control processing of storing specific authentication information for a specific user in a memory of the communication apparatus;
- acquisition processing of, when an upload instruction for uploading target data to the service providing server is input from the specific user, using the specific authentication information in the memory to acquire a specific e-mail address from the service providing server, wherein the specific e-mail address is stored in the service providing server in association with the specific authentication information; and
- upload processing of transmitting a specific e-mail, which includes the target data, and in which the specific e-mail address is designated as a transmission destination address, so as to upload the target data to the service providing server.

* * * * *